United States Patent [19]
Bory

[11] 3,857,638
[45] Dec. 31, 1974

[54] APPARATUS FOR REGULATING THE POSITION OF A MACHINE COMPONENT

[75] Inventor: Michael Bory, Zurich, Switzerland

[73] Assignee: Werkzeugmaschinenfabrik Oerlikon-Buhrle AG, Zurich, Switzerland

[22] Filed: Nov. 30, 1973

[21] Appl. No.: 420,553

[30] Foreign Application Priority Data
Dec. 11, 1972 Switzerland.................... 17975/72

[52] U.S. Cl................. 356/153, 250/203, 250/237, 356/172
[51] Int. Cl........................ G01b 11/26, G01j 1/20
[58] Field of Search................ 250/573, 203, 237; 331/94.5 A; 356/152, 153, 172; 219/121 L

[56] References Cited
UNITED STATES PATENTS

| | | | |
|---|---|---|---|
| 3,373,401 | 3/1968 | Bayer............................ | 331/94.5 A |
| 3,544,218 | 12/1970 | Cassidy........................... | 250/573 |
| 3,619,620 | 11/1971 | Ring.................................. | 356/152 |
| 3,641,351 | 2/1972 | Hintringer et al. .................. | 250/203 |

Primary Examiner—James W. Lawrence
Assistant Examiner—T. N. Grigsby
Attorney, Agent, or Firm—Werner W. Kleeman

[57] ABSTRACT

An apparatus for regulating the position of a machine component with the aid of a light beam, especially a laser light beam, incorporating a light source and a beam detector. The light beam is guided between the light source and the beam detector in a protective tube.

8 Claims, 1 Drawing Figure

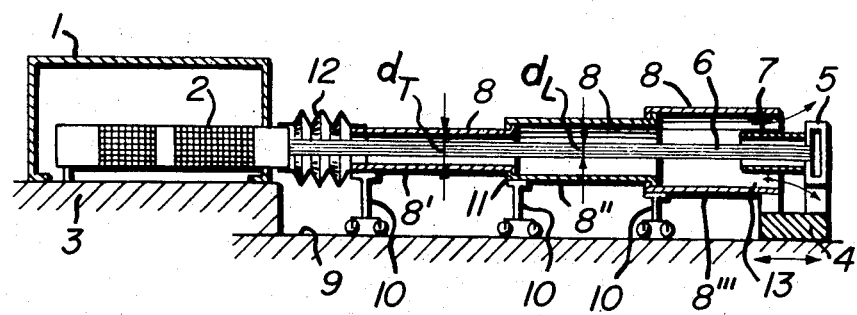

APPARATUS FOR REGULATING THE POSITION OF A MACHINE COMPONENT

BACKGROUND OF THE INVENTION

The present invention relates to a new and improved construction of apparatus for regulating or controlling the position of a machine component with the aid of a light beam, especially a laser light beam, incorporating a light source and a beam detector.

With a known construction of apparatus of this type, the light beam transmitted from the laser source travels unprotected to the beam detector, which under some circumstances can be arranged at a considerable distance from the light source at a displaceable machine component. With this arrangement there exists the danger that the beam detector —although it does not change its position— nonetheless indicates a positional change, since the light beam tends to migrate owing to air turbulence. In the first instance, such air turbulence causes changes in the refractive index, bringing about a disturbance in the measurements. Furthermore, stray or disturbing light emanating from the surroundings can falsify the measurement results.

SUMMARY OF THE INVENTION

Hence, it is a primary object of the present invention to provide an improved apparatus for regulating the position of a machine component which is not associated with the aforementioned drawbacks and limitations of the prior art proposals.

Another and more specific object of the present invention aims at rendering the aforementioned measurement operation independent of the previously discussed disturbance factors.

Still a further significant object of the present invention relates to an improved apparatus for regulating the position of a machine component, which apparatus embodies a light beam and a beam detector and means for detecting the light beam against influences which could adversely alter the measuring operation.

Now in order to implement these and still further objects of the invention, which will become more readily apparent as the description proceeds, the invention contemplates guiding the light beam between a light source and the beam detector in a protective tube or equivalent structure.

BRIEF DESCRIPTION OF THE DRAWING

The invention will be better understood and objects other than those set forth above, will become apparent when consideration is given to the following detailed description thereof. Such description makes reference to the annexed drawing wherein the single Figure of the drawing depicts an exemplary embodiment of the invention.

DETAILED DESCRIPTION OF THE PREFERRED EMBODIMENTS

Describing now the drawing, according to the single Figure thereof a housing 1 equipped with a light source 2, typically a laser light source, is arranged at a stationary machine component 3. This stationary machine component 3 is not subjected to any deformation during alternate loading of the machine. A further machine component 4, in the form of a carriage or slide, is movably mounted upon the schematically illustrated machine bed. A beam detector 5 is arranged upon this movable machine component or part 4. The beam detector 5 is aligned with a light beam 6 emanating from the laser light source 2 and is seated in an impact tube 7 which is open in the direction of the light beam 6. This impact tube 7 piercingly extends into a telescopic tube or pipe 8 having a non-reflecting internal surface and which concentrically surrounds the light beam 6 and widens in step-wise fashion in the direction of the beam detector 5. The individual components or parts 8', 8'' and 8''' of the telescopic tube 8 are guided at a guide track 9 by means of roller mounted-support elements 10. Furthermore, these individual components of the telescopic tube 8 are mutually sealed at their overlapping locations or portions against the entry of dust and light by suitable collars or packing rings 11. In order to prevent the transmission of oscillations to the stationary laser light source 2, the end of the telescopic tube at the side of the laser is connected via a bellows 12 with the laser light source 2. At the detector end the telescopic tube 8 is provided with an annular or ring-shaped gap-like opening 13 between itself and the impact tube 7, in order to permit the entry or departure of air at this location during a change in the length of the telescopic tube 8. It has been found that with the described construction of the system, it is advantageous for a disturbance free indication of the detector 5 that the minimum diameter $d_T$ of the telescopic tube should have a dimension which at least corresponds to five times the diameter $d_L$ of the light beam i.e., $d_T \geq 5 d_L$.

While there is shown and described present preferred embodiments of the invention, it is to be distinctly understood that the invention is not limited thereto, but may be otherwise variously embodied and practiced within the scope of the following claims. Accordingly,

What is claimed is:

1. An apparatus for regulating the position of a movable machine component with the aid of a light beam, especially a laser light beam, comprising a light source arranged at a stationary machine component for producing a light beam and a beam detector arranged at said movable machine component for detecting the light beam, and a protective telescopic tube for protecting the light beam between the light source on said stationary machine component and the beam detector on said movable machine component.

2. The apparatus as defined in claim 1, wherein the telescopic tube has a non-reflecting internal surface.

3. The apparatus as defined in claim 1, wherein the diameter of the telescopic tube at its narrowest location is at least five times greater than the diameter of the light beam.

4. The apparatus as defined in claim 1, further including roller-mounted support elements and a guide track, said telescopic tube incorporating individual tube components which are supported via the roller-mounted support elements at said guide track.

5. The apparatus as defined in claim 1, wherein such telescopic tube is fixedly connected at one end with the movable machine component and is connected at its other end by means of a bellows with the light source.

6. The apparatus as defined in claim 1, wherein said telescopic tube includes overlapping portions which are sealed by packing ring means.

7. The apparatus as defined in claim 1, further including an impact tube substantially concentrically extending into the telescopic tube, the beam detector being arranged in said impact tube.

8. The apparatus as defined in claim 7, wherein said telescopic tube widens in a step-like manner in the direction of the beam detector, and a ring-shaped gap-like air outlet opening provided between the impact tube and the telescopic tube.

* * * * *